United States Patent

[11] 3,568,977

| [72] | Inventor | John F. Nelson |
| | | Des Plaines, Ill. |
| [21] | Appl. No. | 796,306 |
| [22] | Filed | Jan. 29, 1969 |
| [45] | Patented | Mar. 9, 1971 |
| [73] | Assignee | Illinois Tool Works, Inc. |
| | | Chicago, Ill. |

[54] VALVE ASSEMBLY
18 Claims, 6 Drawing Figs.

[52] U.S. Cl.................................................. 251/148,
137/525.3, 285/3, 285/162, 137/512.15
[51] Int. Cl.......................................... F16l 37/28,
F16k 15/16
[50] Field of Search.................................. 251/148,
367, 5; 137/479, 480, 231, 515.5, 515.7, 525.3,
525.1, 512.15, 512.4; 285/3, 162

[56] References Cited
UNITED STATES PATENTS

| 2,236,477 | 3/1941 | Fuchs | 137/512.15X |
| 3,034,731 | 5/1962 | Chapin | 137/525.1X |
| 3,319,836 | 5/1967 | Cubitt | 137/525.3X |
| 3,465,786 | 9/1969 | Spisak | 137/525.3X |

FOREIGN PATENTS

| 528,982 | 8/1956 | Canada | 137/525.1 |
| 291,819 | 7/1965 | Netherlands | 251/5 |

Primary Examiner—M. Cary Nelson
Assistant Examiner—R. B. Rothman
Attorneys—Robert W. Beart, Michael Kovac, Barry L. Clark and Jack R. Halvorsen ABSTRACT: A one-way flap-type check valve for use with low pressure installations. All portions of the valve are capable of being snapped together in sealing relation to one another and in sealing relation to an apertured workpiece.

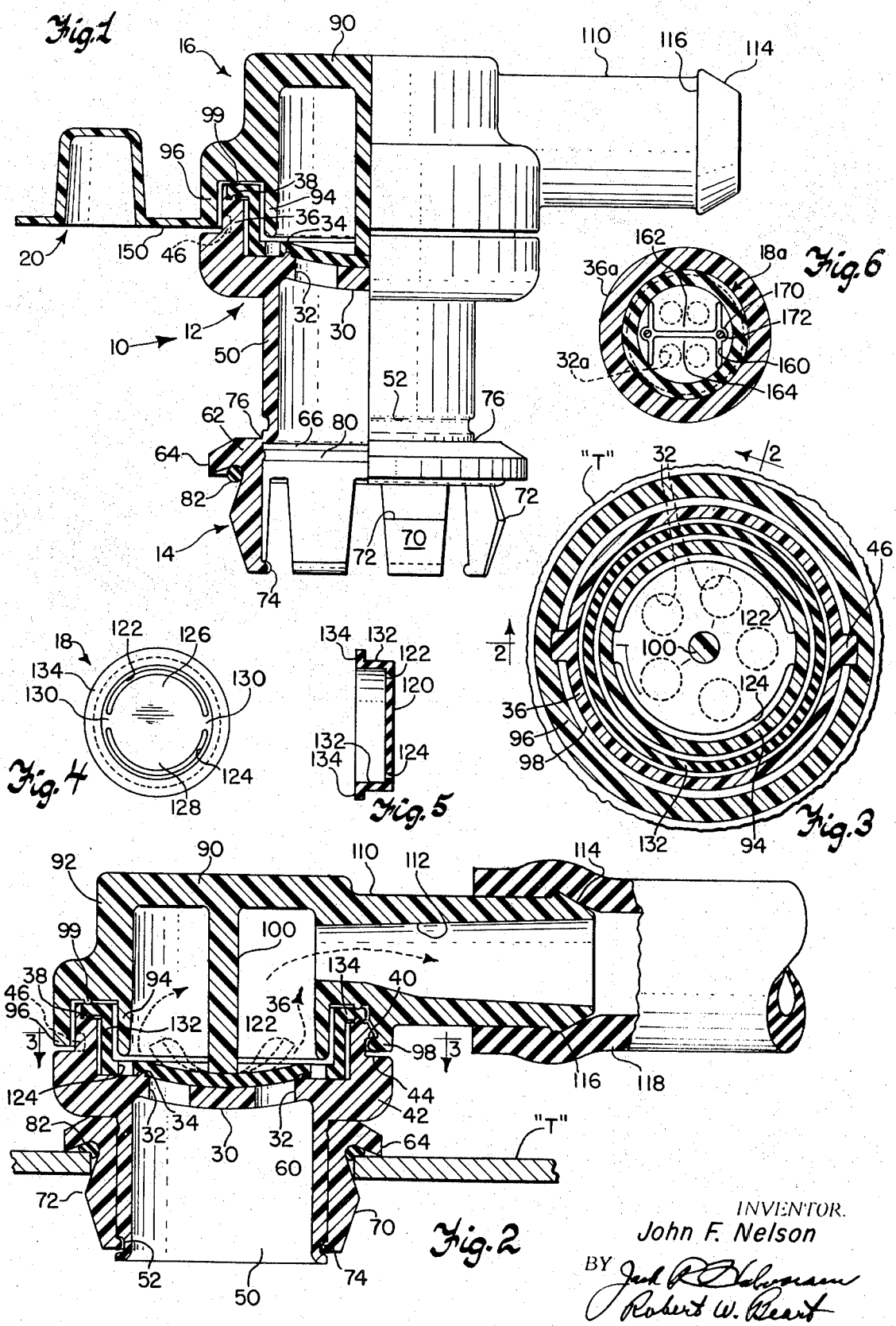

VALVE ASSEMBLY

BACKGROUND OF THE INVENTION

Valving devices which permit passage of fluids in a single direction through the use of a flexible diaphragm or flap means overlying one or more apertures are known in the art. Normally, however, such devices have been fabricated from a plurality of metallic screw-machine parts which are costly to fabricate and subject to corrosion from the environment in which they are utilized.

SUMMARY

The invention relates to a molded one-way flap-type valve assembly which can be manually assembled as by snapping the various elements together by hand into a sealing relationship. The assembly includes means for mounting the assembly in sealed relationship to an apertured workpiece with the mounting means formed initially integral by a frangible portion with at least one part of the assembly. The assembly further including means to preload the valve flap in a closed position.

DRAWINGS

FIG. 1 is a vertical view in partial section of an embodiment of the present invention;

FIG. 2 is a vertical view in partial section showing the embodiment of FIG. 1 in installed position, as taken along line 2-2 of FIG. 3;

FIG. 3 is a sectional plan view taken along line 3-3 of FIG. 2;

FIG. 4 is a plan view of the combination valve and gasket used in this embodiment;

FIG. 5 is an elevational view in section taken along line 5-5 of FIG. 4; and

FIG. 6 is a plan view in partial section of a further embodiment of the present invention.

DESCRIPTION

Referring now to the drawing wherein similar parts are designated by similar numerals, a valve assembly 10 of the type contemplated by the present invention includes a body means 12, a fastening means 14, a cap means 16, a combination valve means 18 and anticontaminating means 20.

The cup shaped body means 12 includes a base 30 having one or more apertures 32 which are through bores which traverse the base. In the present embodiment the base 30 is dished to provide a concavity facing upwardly as viewed in the drawing, for purposes best set forth hereinafter, but in other embodiments may be flat. Extending around the periphery of the base and encircling the apertures 32 is an annular rib or bead 34, the function of which is set forth hereinafter. An annular flange 36 extends axially from one face of the base 30 and includes an outwardly extending protuberance or shoulder means 40 facing toward the base 30. In the present embodiment the shoulder 40 is opposed by a thickened wall portion 42 which forms an abutment or stop means 44 which is axially spaced from and opposing the shoulder 40.

The shoulder 40 is substantially continuous throughout the periphery of the annular flange 36 but is interrupted in one or more segments by a locating or rotation preventing means 46 which fills in the void between the outer surface of wall 36 and the radial extremity of shoulder 40, for purposes set forth hereinafter.

Extending from the opposite face of base 30 is an axially extending tube 50 which encircles all of the apertures 32 and has a predetermined external diameter. Tube 50, adjacent its free extremity is provided with an outwardly facing annular groove 52 for purposes set forth hereinafter.

To fasten the body means 12 within an aperture 60 of a workpiece or tank T the present invention contemplates a mounting or fastening means 14. This means includes a head 62 having an annular dished flange 64 forming a concavity on its lower side, as viewed in the drawing, with a central through bore 66 substantially identical in diameter to the predetermined diameter of the tube 50. Extending axially from the head 62 are a plurality of legs 70 having their inner surface falling on an axial extension of said predetermined diameter of the bore 66. The outside surface of the legs 70 are tapered outwardly from their free extremity to an intermediate point and then tapered inwardly toward the juncture with the head 62 to form a shoulder means 72. Legs 70 are flexible and are adapted to be moved inwardly during telescopic assembly with the aperture 60 until the head 62 is seated on one surface of tank T while the second tapered surface forming shoulder means 72 underlies the opposite surface of tank T. Each of the legs 70 are provided with an internal rib 74 which are substantially complementary to the groove 52 of the tube 50. In the present invention the mounting means 14 is initially connected to the free extremity of tube 50 by a thin frangible connection 76 which is adapted to be fractured when an axial blow is applied to the body means 12 and the mounting means 14. The inside wall of bore 66 includes a a small annular ring or rib 80 which projects into the bore from 0.003—0.005 inches to grippingly embrace the outer surface of tube 50 as it is axially telescoped within the bore 66. As the tube 50 progresses axially it forces the legs 70 and their appended shoulder 72 into positive locked relation with the under surface of tank T. When the base 30 is seated against the upper surface of head 62, as viewed in FIG. 2, the ribs 74 engage the groove 52 and prevent retrograde movement. The dished flange 64 of head 62 sealingly engages the outer surface of tank T and, if desired, an additional sealing ring 82 can be provided in the concavity of head 62 with ring 82 being distorted to fill the voids of aperture 60, as shown in FIG. 2 to provide a sealed joint between the workpiece and the mounting means.

Cap means 16 assumes the form, in this embodiment, of an inverted mating cup shaped member having a continuous base 90 and an axially extending wall portion 92 which is integral with the base 90. The free extremity of wall portion 92 is enlarged and grooved to form a double wall including an inner wall 94 and an outer wall 96 which are adapted to embrace the flange 36. In the present embodiment the outer wall 96 has an inwardly directed annular protuberance 98 which is substantially continuous except for a plurality of interruptions equal in number to the locating means 46 of the body means 12. The inwardly directed rib 98 forms a fastening means for cooperation with the shoulder 40 located on the flange 36 whereby axial telescoping of the two parts together with the locating means 46 properly oriented results in a juncture of the parts.

Extending axially from the inner side of base 90 is a preloading means for the valve in the form of an axial column 100 which has an axial extent slightly less than the distance from the inner surface of base 90 to the inner surface of body means base 30, for purposes set forth hereinafter.

Extending laterally from the cap means 16 is a port means 110 in the form of a tubular member having an internal bore 112 communicating with the interior of the cap means 16. The outer wall of the tubular member 110, adjacent its free extremity is tapered as at 114 and provided with an annular shoulder 116 adapted for acceptance of a flexible hose 118, as is well-known in the art.

To complete the assembly the valving element 18, in the present embodiment is a combination flat-type diaphragm and gasket. In its initial condition is provided with a flap base 120 which is interrupted by a pair of circumferentially extending segmental slots 122 and 124 to provide a pair of flaps 126 and 128, respectively which are connected to the balance of the base by a pair of oppositely disposed segments 130. An annular flange 132 extends axially from the base 120 and terminates in a laterally extending annular flange 134 which forms, in this embodiment, a sealing gasket. In assembly of the present embodiment the valve element 18 is dropped into the interior of the cup shaped body means 12 prior its assembly with cap means 16. The free extremity of flange 36 is provided with an axially extending annular ring or bead 38 which is opposed by a similar annular rib or bead 99 located in the base of the groove between the inner wall 94 and the outer wall 96. As the body means 12 and the cap means 16 are assembled, the ribs 38 and 99 bite into and distort opposite faces of the flange 134 to form a positive seal between the body means 12 and the cap means 16. It being noted, at this point, that the inner wall 94 an the outer wall 96 are spaced sufficiently apart to accept and embrace the flange 36 of the body means 12 and the flange 132 of the valve element 18.

The preloading means or axial column 100 presses against the central portion of the base 120 of the valve element and distorts it into a concave shape complementary to the base 30 whereby the flaps 126 and 128 are brought into intimate engagement with the sealing rib 34 in a preloaded condition. It has been found that an arrangement of this type will permit this device to operate with pressures as low or lower than 1 pound per square inch.

As an added feature to this invention there is included an anticontamination plug 20. This initially is formed integral with the cap means 16 by a frangible connection 150 to which is capable of being fractured by manual manipulation.

The valve assembly 10 preferably has the body means 12, mounting means 14 and cap means 16 injection molded of plastic materials such as nylon which are capable of producing a substantially rigid part affording flexibility to certain elements by controlled wall thicknesses. The normal assembly prior to delivery to the ultimate user include the body means 12, the valve element 18 and the cap means 16. The ultimate user would then insert the flexible leg 70 into the aperture 60 of the workpiece T and strike the base 90 of the cap means 16 to produce the axial blow necessary to fracture frangible connection 76. This would result in the locking of the shoulder 72 behind the panel. The operator would then remove the anitcontamination plug 20 by fracturing the element 150 and insert the plug into the free end of the bore 112. In this fashion all external contaminations such as dirt or grit is prevented from entering into the chamber housing the valving element 18. As the workpiece is moved along the assembly line the valve is thus totally protected until the time that the tubing 118 is supplied. At this point the plug 20 is removed and the tubing is slid over port means 110 until the desired engagement of shoulder 116 with the interior of the tube is accomplished.

The modification of the present invention is seen in FIG. 6 wherein similar parts are designated by similar numerals with addition of the suffix a. In this embodiment the valving element 18a includes an H-shaped slot 160 which provides a pair of opposed flaps 162 and 164. In this embodiment the valve diaphragm is generally a circular flat member which is associated with a flat base (not shown) surrounded by flange 36a and maintained in sealed relationship by axially extending the inner wall 94 until it contacts the element 18a and serves to provide a seal between the body means 12 and cap means 16. With the arrangement of flaps 162 and 164 it is desirable to provide an even number of apertures 32a and hence it is necessary to orient the valve element 18a as by means of cutouts 170 which accommodate axially extending pin means 172. In the initial embodiment shown in FIGS. 1 through 5 the apertures 32 preferably are unequal in number so that it is unnecessary to orient the valving element relative to the apertures, as is the case in the secondary embodiment.

Thus, the embodiments of the present invention contemplate a simple efficient valving assembly for use with low pressure systems such as the vacuum system utilized in power brake assemblies in automobiles wherein the workpiece or tank T serves as a vacuum reservoir to insure availability of a vacuum source even when there is a failure of the main propulsion system which drives the vacuum pump. It will be appreciated by those skilled in the art that the base 30 of body mean 12 can be flat and that the valve element 18 will operate in conjunction with such a flat seat without the necessity of the preloading column 100. The valve element 18 can be replaced by a flat annular disc having slots with the inner wall 94 being positioned closer to the outer wall 96 by elimination of the flange 132 and to have the free extremity of inner wall 94 serving the seat and seal valve element 18 against the base 30. The upper port 110 can be relocated either in an angular position or in a vertical relationship through the base 90.

While other modifications will be apparent to those skilled in the art it is my intent that I will be limited only by the appended claims.

I claim:

1. A check valve assembly including apertured cup-shaped body means having a valve seat and port means, a valve element adapted to provide one-way passage for fluids in cooperation with said apertured body means, cap means cooperatively covering said body means, and having port means communicating with the interior of said cap means and body means, said body means including a base having one or more apertures, an annular flange extending axially from said base, fastening means on said flange for cooperation with said cap means, sealing means for cooperation with said body and cap means to seal their assembly, said cap means including an inverted cup-shaped member having means for cooperative mounting in fastened relation to said annular flange of said body means, said valve element being flexible and resilient and substantially covering the inner surface of the base of said body means, said element having at least one flap portion lanced from the central portion of said element and adapted to overlie the apertures in said base, said element including means for cooperation with said cap and body means to seal the juncture therebetween, and mounting means adapted to cooperate with the port means of said body means for mounting said assembly to an apertured workpiece.

2. An assembly of the type claimed in claim 1 wherein said inverted cup-shaped member includes a base portion and an axially extending wall portion, said cap port means communicating with at least one of said portions, said wall having at least its free extremity grooved to form a spaced double wall portion extending axially from said wall portion and adapted to embrace opposite sides of said annular flange in assembled relation, means for cooperation with said flange fastening means to maintain said body and cap means in assembled relation.

3. An assembly of the type claimed in claim 1 wherein the base of said groove includes an axially projecting rib adapted to cooperate with the free extremity of said flange to seal the cap and body means when in assembled relation.

4. An assembly of the type claimed in claim 3 wherein said element includes axially extending means supporting a laterally extending annular resilient flange which overlies said body means flange and is sealingly compressed against said flange by said rib in said groove whereby said cap and body means are sealed when assembled.

5. An assembly of the type claimed in claim 1 wherein said base is concavely dished towards the interior of said cup-shaped body means, preloading means including means axially extending from said cap means to distort said element into a complementary shaped contact with said base.

6. An assembly of the type claimed in claim 1 wherein said base includes an axially extending annular rib for sealing engagement with the preloaded flaps of said element.

7. A check valve assembly including apertured cup-shaped body means having a valve seat and port means, a valve element adapted to provide one-way passage for fluids in cooperation with said apertured body means, cap means cooperatively covering said body means, and having port means communicating with the interior of said cap means and body means, mounting means adapted to cooperate with the port means of said body means for mounting said assembly to an apertured workpiece, said mounting means including a head having a central aperture of predetermined diameter, a plurality of resilient legs extending axially from said head and having external shoulder means for cooperation with an apertured workpiece in which the assembly is to be mounted, said port means of said body means including a tubular member extending axially from the base of said cup-shaped body means, said tubular member having a diameter substantially equal to said predetermined diameter whereby when said tubular member is axially telescoped within said mounting means, said member restrains the inward movement of said legs.

8. An assembly of the type claimed in claim 7, wherein said head means is frangibly connected to the free end of said tubular member.

9. An assembly of the type claimed in claim 7 wherein said tubular member and said legs include interconnecting means for resisting relative movement therebetween when in telescoped relation.

10. An assembly of the type claimed in claim 7 wherein said head includes a radially inwardly directed continuous annular ring for sealing impingement upon the outer complementary surface of said tubular member.

11. An assembly of the type claimed in claim 10 wherein said legs adjacent their free extremities include an inwardly directed circumferentially extending rib means, said tubular member having complementary groove means adapted to accept said rib means to prevent retrograde movement of said tubular member when telescoped within said legs.

12. A check valve assembly adapted to be mounted in an apertured workpiece including a cup-shaped body means, a cap means, a valve element and mounting means, said body means including a base having at least one aperture therethrough and a seat for said element, a continuous flange extending axially from said base and including laterally outwardly extending shoulder means toward said base, a tubular member of predetermined diameter extending axially from said base in a direction opposite to said flange, said tubular member communicating with said apertures and serving as port means for the interior of said apertured cup-shaped body means, said mounting means including a head having a central aperture substantially identical in diameter to said predetermined diameter, a plurality of resilient legs extending axially from said head and each having means for engaging the rear surface of said workpiece when said head is in engagement with the front surface of said workpiece, said head initially being integrally frangibly connected to the free extremity of said tubular member and adapted to be disconnected when said tubular member is axially telescoped through said head and between said legs whereby said legs are prevented from flexing inwardly from their seated position whereby the means for engaging the rear surface of said workpiece are maintained in engagement therewith, an external circumferentially extending groove disposed adjacent the extremity of said tubular member, rib means circumferentially disposed on the interior surface of said legs adapted to engage said groove for preventing retrograde movement of said tubular member when in telescoped relation to said mounting means, an annular rib having a lesser diameter than said predetermined diameter disposed within the aperture in said head and adapted to impinge in sealing relation with said tubular member, said cap means including a generally inverted second cup member having its interior in communication with said body means, said second cup member having a base and a sidewall, the free extremity of said sidewall being grooved in an axial direction to provide a pair of annular spaced wall means, said spaced wall means being adapted to embrace said flange, at least one of said wall means having means to engage said shoulder means to maintain the cap and body means in assembled relation, port means communicating with the interior of said cap means, said flange and said groove having cooperable means for sealing the juncture of said cap and said body means, said valve element being adapted to be seated on the base of said body means, said valve element further including at least one resilient flap means adapted to cover said apertures in said base and adapted to be moved from said covering position when pressure is fluid applied through said tubular member.

13. An assembly of the type claimed in claim 12 wherein said valve element includes means extending axially along said flange and additional means extending laterally from the free end of first means forming a gasket adapted to overlie the free extremity of said flange, annular rib means extending axially within said groove and from the free extremity of said flange means, said rib means impinging on said gasket of said valve to seal the connection between said cap means and body means.

14. An assembly of the type claimed in claim 12 wherein said port means communicating with the interior of said cap means includes a tubular element extending laterally from said cap means and having a through bore which passes through said tubular element and through the sidewall of said cap means.

15. An assembly of the type claimed in claim 12 wherein said head of said mounting means is resiliently dished and includes a concavity facing said legs, sealing means disposed within said concavity, said head being adapted to be flexed when brought into engagement with the front surface of said workpiece and to compress said sealing means against said front surface to thereby seal the aperture of said workpiece through which said mounting means is telescoped.

16. An assembly of the type claim in claim 12 wherein the wall disposed on the interior of said flange has an axial extent relative to said flange such as is caused to impinge upon said valve element and to maintain said element in seated relation to said base.

17. An assembly of the type claimed in claim 12 wherein said apertured base is concavely dished towards the interior of said body means, preloading means adapted to flex said valve element into complementary engagement with said base.

18. An assembly of the type claimed in claim 17 wherein said base includes annular rib means forming a seat against which said flaps of said valve element sealing impinge as stressed by said preloading means.